US010396585B2

(12) United States Patent
Vassilieff et al.

(10) Patent No.: US 10,396,585 B2
(45) Date of Patent: Aug. 27, 2019

(54) UNIVERSAL INDUCTIVE CHARGING SYSTEM FOR A PORTABLE ELECTRONIC DEVICE

(71) Applicants: CONTINENTAL AUTOMOTIVE FRANCE, Toulouse (FR); CONTINENTAL AUTOMOTIVE GmbH, Hannover (DE)

(72) Inventors: Youri Vassilieff, Toulouse (FR); Noman Rangwala, Milton Keynes (GB)

(73) Assignees: CONTINENTAL AUTOMOTIVE FRANCE, Toulouse (FR); CONTINENTAL AUTOMOTIVE G,BH, Hannover (DE)

(*) Notice: Subject to any disclaimer, the term of this patent is extended or adjusted under 35 U.S.C. 154(b) by 180 days.

(21) Appl. No.: 15/463,185

(22) Filed: Mar. 20, 2017

(65) Prior Publication Data
US 2017/0279293 A1 Sep. 28, 2017

(30) Foreign Application Priority Data
Mar. 25, 2016 (FR) ...................... 16 52647

(51) Int. Cl.
H02J 7/14 (2006.01)
H02J 7/02 (2016.01)
(Continued)

(52) U.S. Cl.
CPC .............. H02J 7/025 (2013.01); B60H 1/34 (2013.01); H02J 7/0042 (2013.01);
(Continued)

(58) Field of Classification Search
USPC ....... 320/107, 108, 109, 134, 135, 136, 101, 320/115, 113, 114
See application file for complete search history.

(56) References Cited

U.S. PATENT DOCUMENTS 4,403,182 A * 9/1983 Yeh .................. H01M 2/10 320/110
4,636,703 A * 1/1987 Tohya .................. H01M 10/46 307/150
(Continued)

FOREIGN PATENT DOCUMENTS

EP 1 998 423 A2 12/2008
WO 2014/15840 A1 10/2014

OTHER PUBLICATIONS

FR Search Report, dated Dec. 5, 2016, form corresponding FR application.

*Primary Examiner* — Alexis B Pacheco
(74) *Attorney, Agent, or Firm* — Young & Thompson

(57) ABSTRACT

Disclosed is an inductive charging system for a portable electronic device, the system incorporating at least one induction coil and having a receiving face for the application of the device including a receiving coil positioned on the receiving face in electromagnetic contact with the induction coil. The receiving face includes multiple series of tabs defining at least discontinuously a perimeter corresponding to the device, the tabs of each series projecting from the receiving face in a first position being movable from the first position to a second position in which each tab is retracted into the receiving face under an application of a force corresponding to that exerted on this tab by the device when applied against the receiving face.

20 Claims, 2 Drawing Sheets

(51) Int. Cl.
  *B60H 1/34*     (2006.01)
  *H02J 7/00*     (2006.01)
  *H02J 50/12*    (2016.01)
  *H02J 50/90*    (2016.01)

(52) U.S. Cl.
  CPC ............ *H02J 7/0044* (2013.01); *H02J 50/12* (2016.02); *H02J 50/90* (2016.02)

(56) References Cited

U.S. PATENT DOCUMENTS

| | | | | |
|---|---|---|---|---|
| 5,686,811 | A * | 11/1997 | Bushong | H02J 7/0042 320/110 |
| 6,610,941 | B2 * | 8/2003 | Pfeiffer | H01H 3/16 200/17 R |
| 6,710,577 | B1 * | 3/2004 | Shum | H01M 10/441 320/112 |
| 7,764,045 | B2 * | 7/2010 | Hoffman | H01M 2/1033 320/107 |
| 7,884,573 | B1 * | 2/2011 | Larsen | H01M 2/1033 320/110 |
| 2002/0117995 | A1 * | 8/2002 | Oh | H02J 7/0042 320/107 |
| 2007/0069688 | A1 * | 3/2007 | Satsuma | H02J 7/0042 320/110 |
| 2008/0111518 | A1 | 5/2008 | Toya | |
| 2014/0176057 | A1 * | 6/2014 | Van Wiemeersch | H02J 7/0044 320/108 |
| 2015/0137747 | A1 * | 5/2015 | Salter | A61L 2/10 320/108 |
| 2016/0087668 | A1 * | 3/2016 | Ben Abdelaziz | H02J 7/0044 455/41.1 |
| 2016/0099606 | A1 * | 4/2016 | Zhang | H02J 7/0044 320/108 |
| 2016/0118841 | A1 | 4/2016 | Makwinski et al. | |
| 2016/0161052 | A1 * | 6/2016 | Griggs | F16M 11/24 320/108 |
| 2016/0164335 | A1 * | 6/2016 | Kanahara | H02J 7/0044 320/108 |

* cited by examiner

UNIVERSAL INDUCTIVE CHARGING SYSTEM FOR A PORTABLE ELECTRONIC DEVICE

FIELD OF THE INVENTION

The present invention relates to a portable electronic device stand with an integrated battery, this stand forming part of a system for inductive charging of the electronic device's battery. This charging system is adaptable to a selection of multiple portable electronic devices, hence the term universal applied to this selection.

BACKGROUND OF THE INVENTION

The inductive charging system includes at least one induction coil and the portable electronic device includes at least one receiving coil or induced coil. The induction coil or coils are electrically isolated from the receiving coil or coils. The energy is transferred by electromagnetic coupling between the induction coil and the receiving coil, which creates an induced current in the receiving coil used to charge the battery or batteries of the portable electronic device.

The portable electronic device is advantageously a mobile phone but may also be, without this being restrictive, a personal assistant, an audio and/or video player, a graphics tablet or a navigation device.

The charging system comprises a flat receiving face beneath which the induction coil or coils are placed. The portable electronic device is placed on this receiving face, in general the back of the device against the receiving face. As the charging system is intended to perform the inductive charging of a portable electronic device from among a selection of portable electronic devices of different dimensions and therefore to be universal for this selection, the stand is relatively flat and does not take the shape of a cradle specifically dedicated to one type of portable electronic device.

The efficiency of the electromagnetic coupling between the induction coil and the inductive receiving coil depends on the correct alignment of same and a small distance that separates them. The fact that the receiving face formed by the charging system does not have a cradle means that the alignment between the induction and receiving coils is not mechanically ensured.

There are principally three systems of inductive charging of a portable electronic device of the mobile phone type that can be used in a motor vehicle.

The first inductive charging system includes a stand having elements for locking the electronic device in position for centering it in a charging position with respect to a single inductive coil that the system comprises.

The second charging system is a system with multiple induction coils for charging the battery of the portable electronic device regardless of its position on the system stand.

The third charging system includes an induction coil that can move in order to be positioned with respect to a receiving coil for the electronic device once it has been placed on the stand provided by the charging system. Elements for detecting the receiving coil must be present in the system as well as elements for moving the induction coil, these moving elements being guided by a control device according to the data provided by the detection elements.

These three charging systems, however, have drawbacks which are specific to them and which do not allow them to provide an optimum price/quality ratio.

The first system is certainly economic but not very efficient. It calls for participation from the user which is notably detrimental when the user is a driver of the motor vehicle who may be distracted by this participation, which is to be avoided.

The second system with multiple induction coils is costly. In addition, this second system does not ensure an optimum electromagnetic coupling between one of the induction coils and the receiving coil carried by the electronic device.

The third system is accurate and ensures a good electromagnetic coupling between the inductive coil of the system and the receiving coil carried by the electronic device. However, it is very expensive and relatively not very robust since it is very complicated to implement, the moving elements of the inductive coil and the elements for detecting the position of the receiving coil being easily able to deteriorate, which may give false indications regarding the location of the receiving coil.

In this third system, the detection elements indeed involve having a receiving area for the electronic device on the system that allows the detection elements to ensure optimum detection. This receiving area is then rendered fragile and may be easily damaged.

The problem at the heart of the present invention is to design an inductive system for charging the battery or batteries of a selection of different portable electronic devices that is easily adaptable to each of the electronic devices by ensuring an alignment of the electronic device with the charging system in order to allow inductive charging while not having the drawbacks of the prior art charging systems.

SUMMARY OF THE INVENTION

The invention relates to an inductive charging system for a portable electronic device from among a selection of portable electronic devices of different dimensions, the system incorporating at least one induction coil and having a stand comprising a receiving face onto which the device comprising a receiving coil is applied, the device being positioned on the receiving face so that the induction coil of the system and the receiving coil of the specific device are in electromagnetic contact, characterized in that the receiving face includes multiple series of tabs, each series of tabs defining at least discontinuously a perimeter corresponding to a respective device of the selection of devices, the tabs of each series projecting from the receiving face in a first position, the tabs of each series being movable from the first position to a second position in which each tab is retracted into said receiving face under an application of a force corresponding to that exerted on this tab by the respective device when applied against the receiving face.

The technical effect is to obtain an accurate and stable centering in position of a portable electronic device against a charging system. The charging system has multiple series of tabs with each series configured for matching at least one portable electronic device. When the portable electronic device is placed against the receiving face, the tabs of the series of tabs which is specific thereto retract as well as the series of tabs specific to devices of smaller dimension. On the other hand, the other series of tabs specific to devices of larger dimension remain projecting and form a stop against a possible movement of the portable electronic device on the receiving face.

The centering of the portable device on the charging system is accurate because of the provision of at least one series of tabs specific to the device on the receiving face of the charging system. It is understood that the user knows approximately the position in which they must place their portable device on the charging system, the series of tabs which then project providing them with a visual aid.

In addition, the centering is stable because of the restriction on movement of the portable device by the other series of tabs not yet retracted, these unretracted tabs forming a stop against a movement of the portable electronic device. An efficient means is thus obtained at a moderate cost for optimum positioning of a device forming part of a selection of devices on the charging system. The positioning according to the invention does not require complex means for detecting the position of the induction coil in the portable device nor means for moving the coils in the charging system or even the device, as is the case in multiple positioning modes according to the prior art.

What is meant by tab may take various forms. For example, the tabs may have different dimensions in width and length. Tabs of various kinds may be used for delimiting an outline corresponding to a specific electronic device and such an outline may just as easily be discontinuous as continuous.

In a non-restrictive embodiment of the present invention, the tabs may each be in the form of a pin with a rounded tip that is retractable into the interior of the system when a portable electronic device is resting on it. The various series of pins then form discontinuous outlines corresponding to the outline of their associated electronic device.

Advantageously, return elements associated with each tab push the tabs from the second position to the first position, the force of a return element exerted on a tab being less than the force exerted on the tab by the respective device when applied against the receiving face. The tabs are therefore always projecting when no force is applied on same. It follows that the outlines of the various electronic devices are delineated on the receiving face of the charging system.

Advantageously, each series of tabs corresponding to a respective device defines a rectangular area between the tabs thereof, the perimeter defined by the tabs of a longitudinal or lateral side of the rectangular area being symmetrical around the perimeter defined with respect to the tabs of the opposite longitudinal or lateral side with respect to the longitudinal or lateral median axis respectively of the receiving face.

A rectangular shape is the shape most commonly used for portable devices but the invention is not limited to such a shape. The rectangular areas surround one another, which can be used as a visual aid for the user in centering the portable device against the receiving face of the charging system. The same effect could be achieved with series of concentric tabs.

Advantageously, each tab of each series of tabs is aligned with one or more respective tabs of the one or more series of tabs located on the same side of the rectangular area, in a longitudinal direction of the rectangular area when arranged on lateral sides of the rectangular area or in a lateral direction of the rectangular area when arranged on longitudinal sides of the rectangular area. Thus the outline of each portable device associated with a series of tabs is visible on the receiving face when no device is placed on this receiving face.

Advantageously, the tabs of a series of tabs have a smaller projecting height than the tabs of a series of tabs on the same side of the rectangular area that is more external to same with respect to the rectangular area. The portable device may be, for example, slightly raised by the action of a series of tabs already retracted and corresponding to devices of smaller size. Providing the receiving face with tabs of heights increasing with distance away from the interior of the receiving face makes it possible to anticipate this problem.

Advantageously, the aligned tabs of adjacent series of tabs are directly adjacent or separated by a narrow spacing, the aligned tabs of the adjacent series forming tiers or being in the form of blades, the tabs of the same series on the same side of the rectangular area being optionally separated by an interval.

Advantageously, the tabs of the same series of tabs on one side of the rectangular area are paired by linking elements with the tabs of the same series which are symmetrical with them on the other opposite side of the rectangular area, the retraction movement of a tab on one side of the rectangular area leading to a similar movement of the symmetrical tab on the other side of the rectangular area.

Advantageously, the tabs of the series of tabs have their free end tilted toward the interior of the receiving area. This allows a better grip of the portable device when inserted between the tabs of its associated series of tabs, an adjacent series of tabs farther away from the middle of the rectangular area than the series retracted by placing the device being able to prevent the device from coming out in a direction perpendicular to the rectangular area.

The invention also relates to an assembly housing an inductive charging system for such an electronic device, characterized in that the assembly incorporates an element for creating air circulation, the air entering and exiting the charging system via the tabs in the retracted position.

An auxiliary advantage of the present invention compared with the prior art systems is that slots provided for retracting the tabs into the interior of the system may also be used as inlets and outlets for ventilating the interior of the charging system and therefore helping to cool the interior of the charging system.

The series of tabs with their passages via slots in the charging system thus fulfill a dual function: the first function is the optimum positioning of the portable electronic device associated with this series on the receiving face by a facility for retracting the tabs into the interior of the system and the second function is an auxiliary function of ventilating the interior of the charging system. This allows an economy of means for obtaining two different functions.

Advantageously, the assembly is a motor vehicle passenger compartment, the element for creating air circulation being a ventilation duct opening into the passenger compartment or a fan. The charging system may be located, without this being restrictive, on a console, on the front shelf running along the vehicle windshield, particularly in a flat receptacle borne by the shelf or near the gearshift lever between the driver's seat and the front passenger seat, advantageously supporting the electronic device placed horizontally on the face of the charging system stand. The charging system may be permanently incorporated in one of these elements or be removable.

BRIEF DESCRIPTION OF THE DRAWINGS

Other features, objects and advantages of the present invention will appear on reading the following detailed description and examining the accompanying drawings given as non-restrictive examples, in which.

BRIEF DESCRIPTION OF THE INVENTION

The figures are given as examples and are not restrictive on the invention. They constitute outline schematic representations intended to facilitate the understanding of the invention and are not necessarily to the scale of the practical applications. In particular, the dimensions of the various elements illustrated may not be representative of the reality.

In what follows, reference is made to all the figures taken in combination. When reference is made to a specific figure or figures, these figures are to be taken in combination with the other figures for recognizing the designated numeric references.

Figure 1:
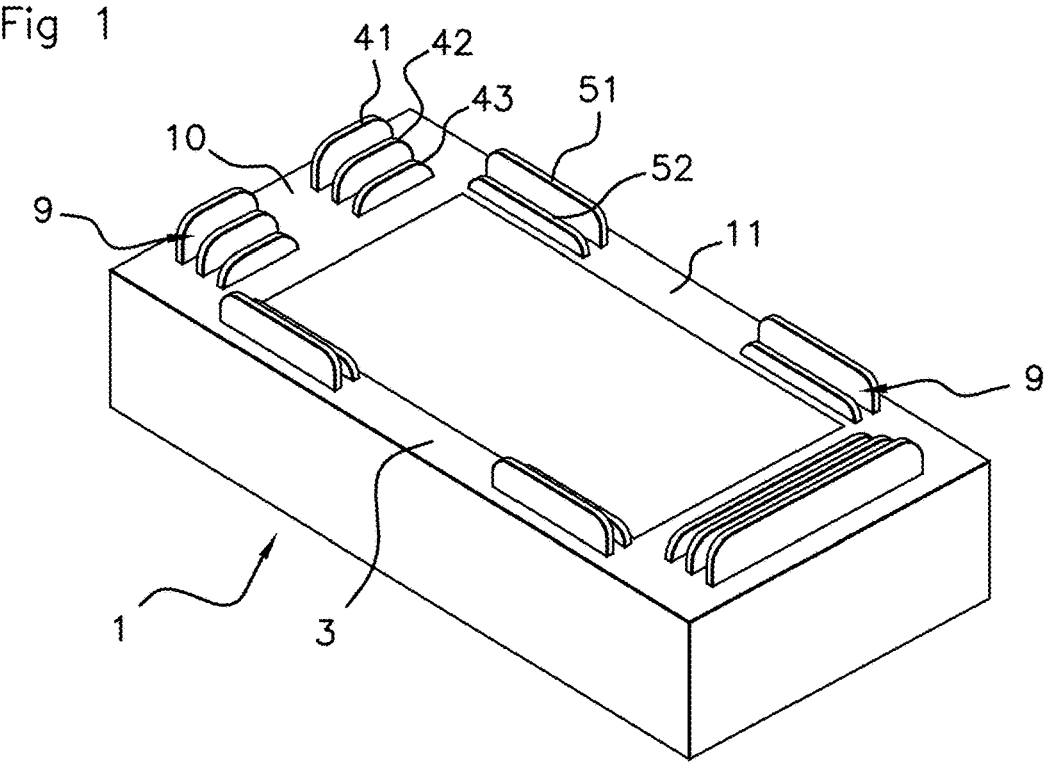
FIGS. 1 and 2 are schematic representations of respective views in perspective of a charging system for a portable electronic device according to the present invention, the receiving face of the charging system being provided with tabs that are retractable under the weight of a portable electronic device when applied against the receiving face.
Figure 2:
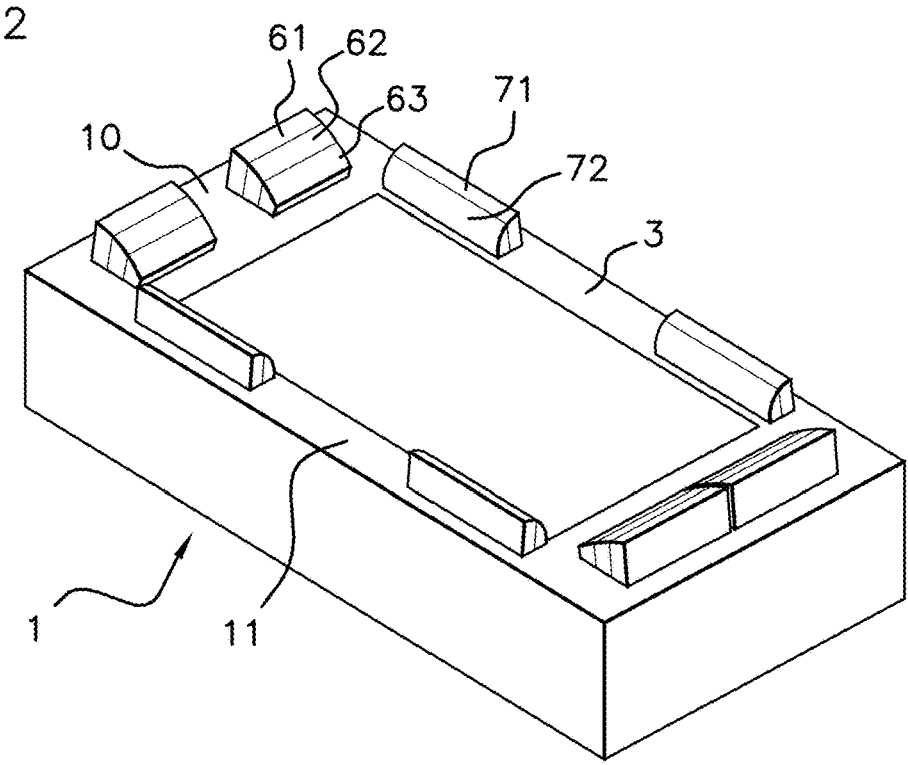

In referring to all the figures and more particularly to FIGS. 1 and 2, the present invention relates to an inductive charging system 1 for a portable electronic device 2 (not represented in FIGS. 1 and 2) from among a selection of portable electronic devices of different dimensions. The system 1 incorporates at least one induction coil. There may be a single induction coil or multiple induction coils, e.g. a central coil surrounded by multiple other coils.

The charging system 1 has a receiving face 3 onto which a device 2 is applied (cf. FIG. 4) selected from among the selection of portable electronic devices. This portable electronic device 2 comprises a receiving coil, the device 2 being positioned on the stand so that the induction coil of the charging system 1 and the receiving coil of the device 2 are in optimum electromagnetic contact, advantageously by being aligned with the induction coil or one of the induction coils. This inductively charges the battery or batteries incorporated in the portable electronic device 2.

According to the present invention, the receiving face 3 of the charging system 1 includes multiple series of tabs. Each series of tabs defines at least discontinuously a perimeter of a respective device from among the portable electronic devices of the selection. The tabs 41 to 43; 51, 52; 61 to 63; 71, 72 of each series project from the receiving face 3 in a first position pointing above this receiving face 3. The tabs 41 to 43; 51, 52; 61 to 63; 71, 72 of each series are movable from this first position to a second position in which each tab 41 to 43; 51, 52; 61 to 63; 71, 72 is retracted into said receiving face 3.

In FIGS. 1 and 2, a single tab is referenced per series of tabs, this tab may be a lateral tab 41 to 43; 61 to 63 arranged on a lateral side of a rectangular area surrounded by a series of specific tabs or a longitudinal tab 51, 52; 71, 72, arranged on a longitudinal side of the rectangular area. The shape of the area delimited by a series of specific tabs is not, however, limited to a rectangular shape.

This retraction takes place under an application of a force corresponding to that exerted on this tab 41 to 43; 51, 52; 61 to 63; 71, 72 by the portable electronic device 2 specific to the series when applied against the receiving face 3. Thus, when a portable electronic device 2 selected by the user in the selection of portable electronic devices is applied against the receiving face 3 resting its weight on this face 3, the tabs 41 to 43; 51, 52; 61 to 63; 71, 72 located below this electronic device 2 are then retracted and re-enter the charging system 1. The other tabs remain largely in place except in the case of a link between opposite tabs with respect to the delimited area, as will be described later.

For example, there may be two or three series of tabs surrounding one another and each corresponding to a portable electronic device 2 that can be selected from at least three devices. Another number is also possible.

A return to the first projecting position of the tabs 41 to 43; 51, 52; 61 to 63; 71, 72 is, of course, possible. To do this, return elements associated with each tab 41 to 43; 51, 52; 61 to 63; 71, 72 push the tabs 41 to 43; 51, 52; 61 to 63; 71, 72 from the second position to the first position.

The force of a return element exerted on a tab 41 to 43; 51, 52; 61 to 63; 71, 72 is less than the force exerted on the tab 41 to 43; 51, 52; 61 to 63; 71, 72 by the portable electronic device 2 specific to a series of tabs when applied against the receiving face 3, for allowing the retraction of the series of tabs 41 to 43; 51, 52; 61 to 63; 71, 72 associated with this device 2 from the first position to the second.

The springs should be suitably calibrated bearing in mind that a device of large dimension involves the re-entry of its series of associated tabs but also of the series of tabs that its series surrounds, these surrounded series of tabs being associated with smaller devices. Such a device is therefore subjected, when positioned on the receiving face 3 of the charging system 1, to the return force of multiple springs of different series of tabs.

The return elements are advantageously incorporated in the charging system 1. These return elements may be in the form of helical springs exercising a return action of the projecting tabs 41 to 43; 51, 52; 61 to 63; 71, 72, as the springs under the keys of many electronic devices 2 frequently do.

Figure 3:
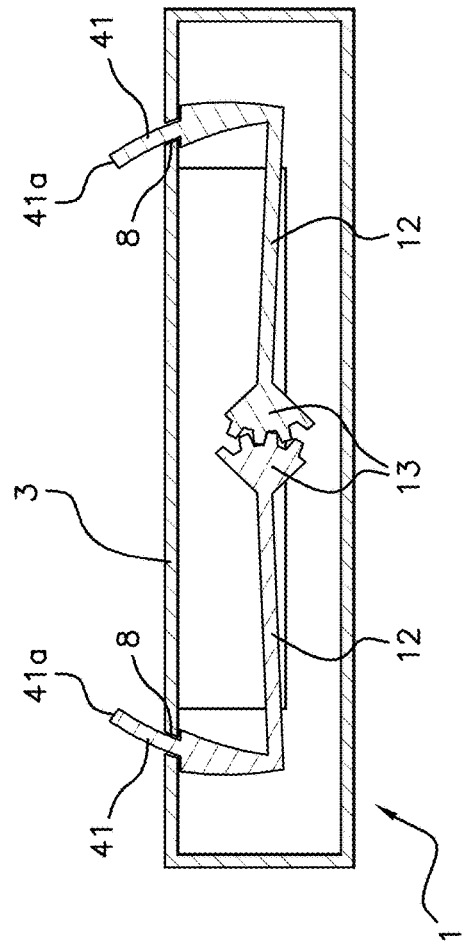
FIGS. 3 and 4 are schematic representations of respective views of a section through a charging system for a portable electronic device according to the present invention, these figures depicting an embodiment of a device for pairing two tabs arranged on opposite sides of the receiving face of the charging system.
Figure 4:
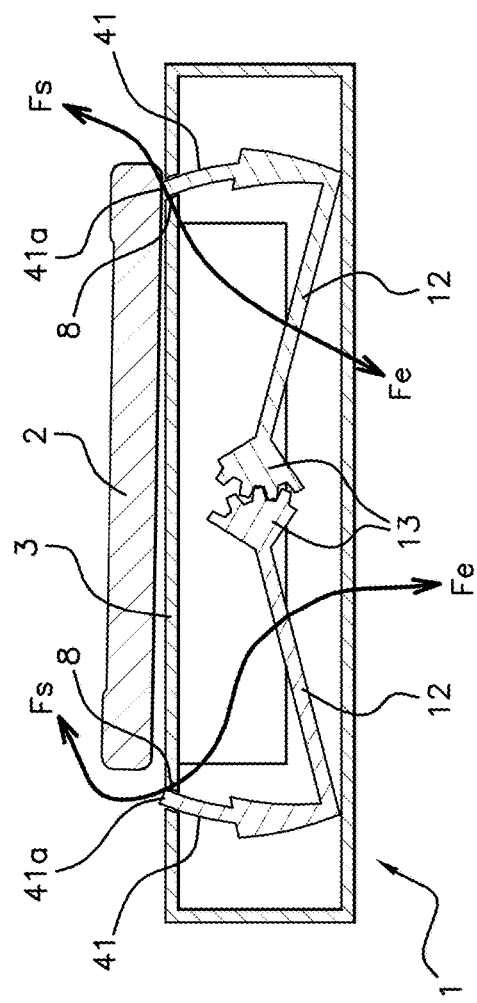

The receiving area 3 has openings in the form of slots acting as passage for the tabs 41 to 43; 51, 52; 61 to 63; 71, 72 for their retraction into the interior of the charging system 1, these slots 8 being referenced in FIGS. 3 and 4.

The arrangement of the tabs 41 to 43; 51, 52; 61 to 63; 71, 72 may be in concentric circles for circular portable electronic elements, which is not excluded. As electronic devices are generally rectangular in shape, this arrangement may be made on successive rectangular areas surrounding one another.

A minimum rectangular area corresponding to the smallest portable electronic device 2 of the selection of portable devices is then delimited at least discontinuously by an innermost series of tabs in the stand. This rectangular area is then surrounded at a distance by one or more rectangular areas corresponding to increasingly large portable electronic devices. This or these rectangular areas are delimited at least discontinuously by one or more series of tabs increasingly close to the exterior outline of the stand.

Each series of tabs may thus define a rectangular area between its tabs 41 to 43; 51, 52; 61 to 63; 71, 72. The tabs 41 to 43; 51, 52; 61 to 63; 71, 72 of a longitudinal or lateral side of the rectangular area thus defined may be symmetrical with the tabs 41 to 43; 51, 52; 61 to 63; 71, 72 of the opposite longitudinal or lateral side, with respect to the longitudinal or lateral median axis respectively of the receiving face 3.

Each tab 41 to 43; 51, 52; 61 to 63; 71, 72 of each series of tabs is aligned with one or more respective tabs 41 to 43; 51, 52; 61 to 63; 71, 72, of the one or more series of tabs located on the same side of the rectangular area either closer or farther away from the center of the receiving face 3.

For example, each longitudinal tab 51 or 52; 71 or 72 of each series of longitudinal tabs is aligned with one or more respective tabs 52 or 51; 72 or 71, of the one or more series of tabs located on the same side of the rectangular area in a lateral direction of the rectangular area surrounding it. The same goes for the lateral tabs 41 to 43; 61 to 63 which are aligned in a longitudinal direction of the rectangular area.

The tabs 43; 52; 63; 72 of a series of tabs may have a projecting height lower than the tabs 41, 42; 51; 61, 62; 71 of a series of tabs which is more external to it with respect to the rectangular area. The successive series of tabs may then form tiers of increasing height the more external the series are to the receiving face 3 formed by the charging system 1. This is depicted in FIGS. 1 and 2.

The tabs 41 to 43; 51, 52, depicted in FIG. 1, may be of a smaller thickness, being, for example, in the form of blades or the tabs 61 to 63; 71, 72, depicted in FIG. 2, may be of a greater thickness. Thus, the aligned tabs 41 to 43; 51, 52; 61 to 63; 71, 72 of adjacent series of tabs are directly adjacent, in the case of tabs 41 to 43; 51, 52; 61 to 63; 71, 72 of greater thickness or separated by a narrow spacing 9, in the case of tabs 41 to 43; 51, 52 forming blades. The tabs may also be in the form of pins, advantageously with a rounded tip.

The tabs 41 to 43; 51, 52; 61 to 63; 71, 72, may be continuous over the whole width or length of the rectangular area or be discontinuous optionally leaving intervals 10, 11 between tabs 41 to 43; 51, 52; 61 to 63; 71, 72 of the same series.

For example, in FIG. 1, the tabs 41 to 43; 51, 52 are in the form of respective blades. On both longitudinal sides of the delimited rectangular areas, two tabs 51, 52 are provided for two series of tabs that are separated by a longitudinal interval 11 therebetween.

In this same figure, on the lateral sides of the delimited rectangular areas, three series of tabs are provided each corresponding to a respective rectangular area with tabs 41 to 43 separated by a lateral interval 10 on the left of FIG. 1 while the successive series of tabs are end-to-end and continuous on the right of FIG. 1.

On the leftmost lateral side of the delimited rectangular areas, for all the series, the tabs 41 to 43 of the same series are discontinuous being separated by a lateral interval 10 not necessarily the same as the longitudinal interval 11 on the longitudinal sides of the rectangular area. Advantageously the lateral interval 10 is smaller than the longitudinal interval 11. On the rightmost lateral side of the delimited rectangular areas, the tabs of the same series are continuous.

In FIG. 2, the tabs 61 to 63; 71, 72 have a broader support area. In this figure, the tabs 61 to 63; 71, 72 of the series of the same side both lateral and longitudinal of the rectangular areas form tiers, that are continuous in the width of the areas as depicted for the right-hand lateral side or discontinuous as depicted for the left-hand side with a lateral interval 10 between the tabs of the same series. The tiers are discontinuous in the length of the rectangular areas on the longitudinal sides, being separated by a longitudinal interval 11.

In this FIG. 2, three series of tabs are provided for the lateral sides of the rectangular areas, whereas two series of tabs are provided for the longitudinal sides of the rectangular areas. Between the aligned tabs 61 to 63; 71, 72 forming the same tier both lateral and longitudinal, a spacing remains that is just sufficient to allow an actuation of a tab 61 to 63; 71, 72 without interfering with an aligned tab 61 to 63; 71, 72 of an adjacent series.

With regard to FIGS. 1 and 2, providing a continuous arrangement on a lateral side of the tabs 41 to 43; 51, 52; 61 to 63; 71, 72 of the same series and a discontinuous arrangement on the other lateral side is in no way mandatory. On the contrary, the arrangements of the tabs 41 to 43; 51, 52; 61 to 63; 71, 72 of the same series may be advantageously all continuous or discontinuous for two opposite sides and advantageously for the four sides of the rectangular areas.

As depicted in FIGS. 1 and 2 without reference for the free end and also in FIGS. 3 and 4 with reference for the free end 41a, the tabs of the series of tabs may have their free end 41a tilted toward the interior of the receiving area 3.

One particularly advantageous embodiment will now be described in relation to FIGS. 3 and 4. The reference 41 in these figures is taken to designate the tabs but this may be applicable to any tab 41 to 43; 51, 52; 61 to 63; 71, 72 depicted in FIGS. 1 and 2.

The tabs 41 of the same series of tabs on one side of the rectangular area may be paired by linking elements 12, 13 with the tabs 41 of the same series which are symmetrical with them on the other opposite side of the advantageously rectangular receiving area 3. This mainly concerns the symmetrical tabs previously described.

The retraction movement of a tab 41 on one side of the rectangular area may then lead to a similar movement of the symmetrical tab 41 on the other side of the rectangular area delimited by the series of tabs.

In a preferred embodiment of the linking elements 12, 13 illustrated in FIGS. 3 and 4, each tab 41 may be connected to a connecting rod mechanism 12 and two symmetrical tabs 41 on two opposite sides of a rectangular area have their connecting rod mechanisms 12 mechanically coupled. Each lower end of two tabs 41 mounted symmetrically may be rigidly connected to one end of a connecting rod 12 of which the other end is rigidly connected to a part 13 having a portion that is a toothed circular arc.

The toothed circular arc portions of the parts 13 respectively rigidly connected by a connecting rod 12 to one of the two tabs 41 mounted symmetrically on two opposite sides of a rectangular area delimited by the tabs 41 on the receiving face 3 may engage in one another and each of the parts 13 may be pivotably mounted about an axis extending perpendicularly to the connecting rod 12, at the rigid connection of the part 13 with the connecting rod 12.

FIG. 3 depicts the position of the connecting rod mechanism when no portable electronic device is resting on the charging system 1, and FIG. 4 depicts the position of the connecting rod mechanism when a portable electronic device 2 is resting on the charging system 1 with movement of the connecting rods 12.

When one of the symmetrically mounted tabs 41 is retracted into the interior of the system 1, this tab 41 being referred to as the tab initiating the retraction under the weight of the portable electronic device 2 being the right-hand tab in FIG. 4, the other symmetrical tab 41, this tab being termed the driven tab, follows the retraction movement of the tab initiating the retraction although it is not subjected to the weight of the portable electronic device 2.

When the tab initiating the retraction re-enters the charging system 1, the end of the connecting rod 12 rigidly connected to this tab initiating the retraction drops down with the tab and the part 13 with the circular arc portion pivots about its axis. The circular arc portion of the part 13 associated with the tab initiating the retraction then engages with the opposite circular arc portion 13 associated with the driven tab. The reverse operation is, of course, possible.

Referring to all the figures, the invention also relates to an assembly including such an inductive charging system 1 for an electronic device 2, e.g. an optionally closed space housing the charging system 1 or a piece of furniture such as a table supporting the charging system 1. The assembly incorporates or is associated with an element for creating air circulation, the air entering and exiting the charging system 1 via the tabs 41 to 43; 51, 52; 61 to 63; 71, 72 in the retracted position, more precisely via the slots in the tabs referenced 8 in FIGS. 3 and 4.

FIG. 4 depicts a passage for both incoming and outgoing air into and from the charging system 1 via the slots 8 forming passages for retracting the tabs 41. The arrows Fs and Fe indicate the possible routes of outgoing and incoming air respectively from and into the charging system 1. These slots 8 are made in the receiving face 3 offered by the charging system 1 and each associated with a respective tab 41.

Referring to all the figures, as previously mentioned, the tabs 41 to 43; 51, 52, may be thin, e.g. by being in the form of blades. The tabs 61 to 63; 71, 72, may also be relatively thick. The same goes for each slot 8 in the receiving face 3 via which a tab 41 to 43; 51, 52; 61 to 63; 71, 72 re-enters. Each slot 8 may have dimensions according to the type of tab 41 to 43; 51, 52; 61 to 63; 71, 72 received but the slot 8 may be of a greater width that the thickness of the tab 41 to 43; 51, 52; 61 to 63; 71, 72, in order to allow more air to pass into the interior of the charging system for the ventilation of same.

Similarly the thickness of each tab 41 to 43; 51, 52; 61 to 63; 71, 72, may vary in its length, the thickness of the free end 41a of the tab 41 to 43; 51, 52; 61 to 63; 71, 72 able to be smaller than in other places of the tab, which allows for freeing up a larger passage for the air entering or exiting each slot in the receiving face 3 formed on the charging system 1.

In a preferred application of the invention, the assembly is a motor vehicle passenger compartment. In this case, the element for creating air circulation may be a ventilation duct opening into the passenger compartment or a fan. The portable electronic device 2 should be arranged flat and substantially horizontal on the receiving area 3 of the charging system 1 in order not to slide about when the motor vehicle is traveling.

In this case, the tabs 41 to 43; 51, 52; 61 to 63; 71, 72 remaining unretracted when the electronic device 2 is placed may serve as a stop to the electronic device 2 which is liable to move during acceleration, braking, or driving round bends, hence there is an advantage in leaving little spacing between the series of tabs on the same side of the rectangular areas that they delimit.

The invention claimed is:

1. An inductive charging system (1) for a portable electronic device (2) equipped with a receiving coil, the system (1) comprising:
   a receiving face (3) with a surface for receiving the portable electronic device atop thereon;
   at least one induction coil beneath the receiving face for establishing electromagnetic contact with the receiving coil of the portable electronic device when the portable electronic device is positioned atop the receiving face; and
   a plurality of series of tabs on the receiving face, each series of tabs positioned along a successively longer and wider perimeter on the receiving face,
   the tabs of each series projecting upward from openings in the receiving face in a first position, and the tabs of the plurality of series of tabs, from an innermost one of said series of tabs to an outermost one of said series of tabs, forming tiers of increasing height with respect to the surface of the receiving face (3),
   each one of the tabs being movable to retract from the first position, through a corresponding opening of the openings in the receiving face, to a retracted second position, in which the tab does not project from said receiving face, upon an application of a force upon the tab in a downward direction, so that a surface of the portable electronic device when applied against the receiving face of the charging system causes tabs of one or more of said series corresponding to dimensions of the surface of the portable electronic device to retract from the first position to the second position, while tabs of any series outside the dimensions of the surface of the portable electronic device remain in the first position.

2. The system according to claim 1, wherein return elements associated with each tab urge the tabs from the second position to the first position, a force of a return element exerted on a tab being less than a force exerted on the tab by the portable electronic device when applied against the receiving face of the charging system.

3. The system according to claim 1, wherein each series of tabs defines a rectangular area of the surface of the receiving face that is symmetrical with respect to longitudinal and lateral median axes of the receiving face.

4. The system according to claim 3, wherein each tab of each series of tabs is aligned with one or more respective tabs of another of the one or more series of tabs located on the same side of the rectangular area, in a longitudinal direction of the rectangular area when arranged on lateral sides of the rectangular area or in a lateral direction of the rectangular area when arranged on longitudinal sides of the rectangular area.

5. The system according to claim 4, wherein the tabs of a first series of tabs, in the first position, have a smaller height with respect to the surface of the receiving face than that of the tabs of a second series of tabs on a same side of the rectangular area that is more external to the first series of tabs with respect to the rectangular area.

6. The system according to claim 5, wherein aligned tabs of adjacent series of tabs are directly adjacent, the aligned tabs of the adjacent series forming tiers.

7. The system according to claim 3, wherein first tabs of one of said series of tabs on one side of the rectangular area are paired by linking elements with second tabs of a same one of said series of tabs symmetrical with the first tabs and on an opposite side of the rectangular area, such that a retraction movement of a tab of said first tabs from the first position to the second position causes a similar movement from the first position to the second position of a symmetrical tab of said second tabs.

8. The system according to claim 1, wherein free ends of the tabs are tilted in a direction toward an interior of the receiving area.

9. An assembly housing an inductive charging system for an electronic device according to claim 1, wherein the assembly incorporates an element for creating air circulation, the air entering and exiting the charging system via the tabs in the retracted position.

10. The assembly according to claim 9, wherein said assembly is a motor vehicle passenger compartment, the element for creating air circulation being a ventilation duct opening into the passenger compartment or a fan.

11. The system according to claim 2, wherein each series of tabs corresponding to a respective device defines a rectangular area between its tabs, the perimeter defined by the tabs of a longitudinal or lateral side of the rectangular area being symmetrical around the perimeter defined with respect to the tabs of the opposite longitudinal or lateral side with respect to the longitudinal or lateral median axis respectively of the receiving face.

12. The system according to claim 4, wherein the tabs of the same series of tabs on one side of the rectangular area are paired by linking elements with the tabs of the same series which are symmetrical with them on the other opposite side of the rectangular area, the retraction movement of a tab on one side of the rectangular area leading to a similar movement of the symmetrical tab on the other side of the rectangular area.

13. The system according to claim 5, wherein the tabs of the same series of tabs on one side of the rectangular area are paired by linking elements with the tabs of the same series which are symmetrical with them on the other opposite side of the rectangular area, the retraction movement of a tab on one side of the rectangular area leading to a similar movement of the symmetrical tab on the other side of the rectangular area.

14. The system according to claim 6, wherein the tabs of the same series of tabs on one side of the rectangular area are paired by linking elements with the tabs of the same series which are symmetrical with them on the other opposite side of the rectangular area, the retraction movement of a tab on one side of the rectangular area leading to a similar movement of the symmetrical tab on the other side of the rectangular area.

15. The system according to claim 2, wherein the tabs of the series of tabs have their free end tilted toward the interior of the receiving area.

16. The system according to claim 3, wherein the tabs of the series of tabs have their free end tilted toward the interior of the receiving area.

17. The system according to claim 4, wherein the tabs of the series of tabs have their free end tilted toward the interior of the receiving area.

18. The system according to claim 5, wherein the tabs of the series of tabs have their free end tilted toward the interior of the receiving area.

19. The system according to claim 5, wherein aligned tabs of adjacent series of tabs are separated by a spacing, the aligned tabs of the adjacent series being in the form of blades.

20. The system according to claim 19, wherein the tabs of the same series on the same side of the rectangular area are separated by an interval.

* * * * *